United States Patent [19]

Freeman

[11] 4,168,106
[45] Sep. 18, 1979

[54] PUPIL ENLARGEMENT COMPONENT FOR AN OPTICAL DEVICE

[75] Inventor: Robin J. Freeman, Worplesdon, England

[73] Assignee: Vision Engineering Limited, Surrey, England

[21] Appl. No.: 857,440

[22] Filed: Dec. 5, 1977

[51] Int. Cl.² .............................................. G02B 23/00
[52] U.S. Cl. ......................................... 350/9; 350/36; 350/45; 350/120; 350/127; 350/129; 350/167
[58] Field of Search ....................... 350/9, 36, 45, 167, 350/120, 127, 128, 129

[56] References Cited

U.S. PATENT DOCUMENTS

| 2,588,373 | 3/1952 | Erban | 350/9 X |
| 4,033,683 | 7/1977 | Tancreli | 350/120 X |

FOREIGN PATENT DOCUMENTS 736754  9/1932  France ...................................... 350/128

Primary Examiner—John K. Corbin
Assistant Examiner—Matthew W. Koren
Attorney, Agent, or Firm—Dann, Dorfman, Herrell and Skillman

[57] ABSTRACT

A composite optical component for use in an improved optical system, for example, of the type in U.S. Pat. No. 4,012,109 includes opposed discs having surfaces in contact. The surfaces in contact are grooved with parallel grooves providing an undulating surface every portion of which is arcuate and capable of magnifying an image at a focal plane approximately between the grooved surfaces of the discs. The grooves are arranged transverse to one another, and preferably at 90°, and the component is rotated about an axis normal to the focal point.

21 Claims, 8 Drawing Figures

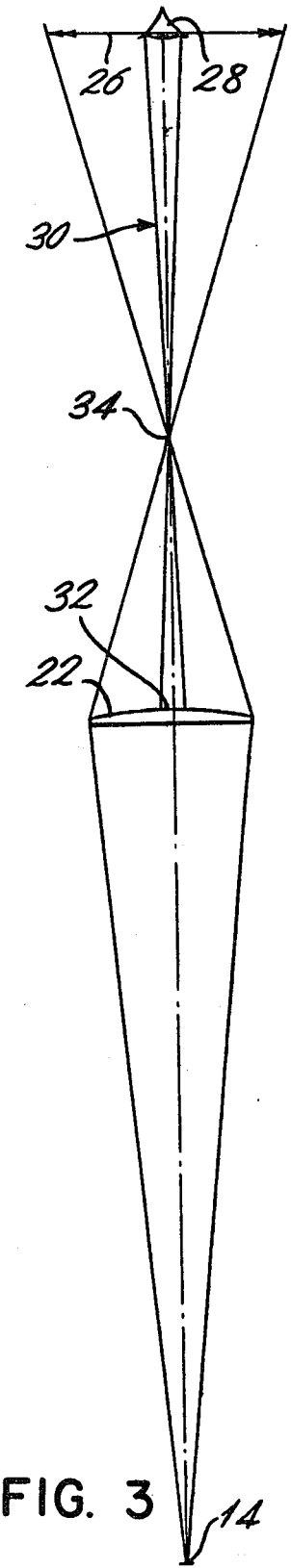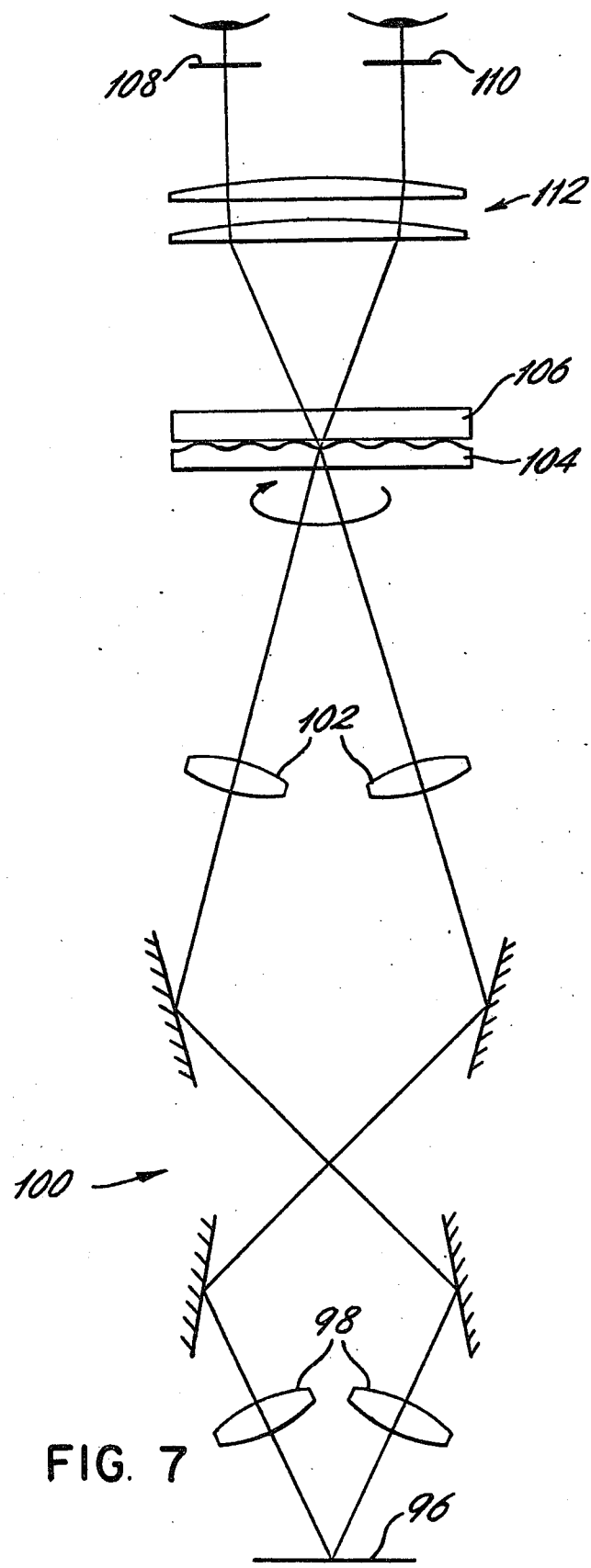
FIG. 3
FIG. 7

PUPIL ENLARGEMENT COMPONENT FOR AN OPTICAL DEVICE

The present invention relates to improvements in optical apparatus, particularly magnifying apparatus such as microscopes and screen projectors. More specifically the present invention relates to improvements in a component for such optical devices enabling the production of a full image of uniform quality, without deterioration in any region of that image.

It is known that the exit pupil of a conventional microscope has a limited diameter so that a viewer's eye must be positioned and held in a closely defined position. If the head is moved transversely, the image is lost and, if the head is moved towards and away from that position, the field size is affected.

In the prior art the problem has been overcome by scanning the conventional exit pupil in space by means of moving elements placed at the image focal plane of the instrument to provide an enlarged pupil. In prior art arrangements, when the moving elements are stationary, no pupil enlargement occurs, but if the viewer's eye is coincident with the stationary pupil, a full field will be observed.

In my prior U.S. Pat. No. 4,012,109 is described an optical system incorporating at the image focal plane of the optical device a movable multilenticular element. That element may be, for example, a generally planar circular element rotatable about an axis at its center perpendicular to its plane and comprising a multiplicity of tiny circular lenses. This differs from the other prior art devices in that with the multi-lenticular element standing in a static condition an enlarged exit pupil is maintained, but an incomplete field is viewed by the observer. There are always a multiplicity of lenticules in the field of view, and there are also non-image-producing flat regions around the lenticules. Rotation of said elements results in the viewing of a complete field and the retention of the enlarged pupil.

However, when the lenticules are circular and the element is a rotatable disc, it has been found that there may be some degradation of the image in the region surrounding the axis of rotation, caused by "flat" areas on the rotatable element between the lenticules. The areas between which, be they flat or long radius of curvature, produce an essentially smaller exit pupil superimposed upon the larger one, creating a so-called "hot spot" condition to the observer. This can be particularly disadvantageous in a stereoscopic instrument. Furthermore, the optical integrity of the surface between the lenticules is not as good as that of the lenticules themselves, which causes a reduction in resolution below the theoretically obtainable limit. Moreover, subsequent research has shown that the size of a lenticular element substantially smaller than previously used is desirable to achieve the desired resolution.

The present invention relates to an improved optical component corresponding to the rotatable disc but having improved optical characteristics which prevent deterioration of the image in the region near the axis of rotation.

More specifically in accordance with the present invention an optical system includes optical means for developing an image at a focal plane. An optical component has a pair of members, at least one of which is light transmissive, with opposed generally planar surfaces approximately in said focal plane. Each of the opposed surfaces of said pair of members has generally parallel grooves, such that any section taken through a member transverse to the grooves is distinguished by undulations formed by the grooves, such that every part of such surface is arcuate. The grooves of one member are arranged transverse to the grooves of the other, whereby each pencil of light passing through said at least one member and reaching the opposed surface of the other member is everywhere subject to the magnifying effect to provide a magnified image in said focal plane. Preferably the radius of curvature is kept uniform at all places so that there is an even distribution of energy across the pupil. A field lens system is arranged to receive light from said optical component.

The field lens system is arranged so that in the absence of the grooved device the system would produce an exit pupil such that, if the eye of a viewer were coincident with said exit pupil, a full field would be seen.

The effect of the grooved members of the optical component is to provide an enlarged pupil, both when the device is at rest and when it is rotating.

Usually the grooved members will comprise two flat discs, each grooved on one surface and with the grooved surfaces in contact and in said focal plane. However, the discs may alternatively be slightly curved as to compensate for field curvature due to other parts of the optical system.

The grooves may be such that each grooved surface comprises a plurality of half cylindrical protrusions or depressions; alternatively there may be alternate protrusions and depressions when the arcuate cross section may be of sinusoidal form. In any arrangement there are effectively no flat areas on the grooved surface. The system may be such that both discs are transparent or one disc may be transparent and the other may have a reflective surface.

Usually the discs will be arranged so that the grooves in one surface are perpendicular to the grooves in the other surface.

For a better understanding of the present invention reference is made to the accompanying drawings in which:

FIG. 3 is a diagram showing schematically the optical effect of one part of one of the discs of FIG. 2;

FIGS. 7 and 8 show schematically reflecting and transmitting stereoscopic microscopes according to the invention.

Figure 1:
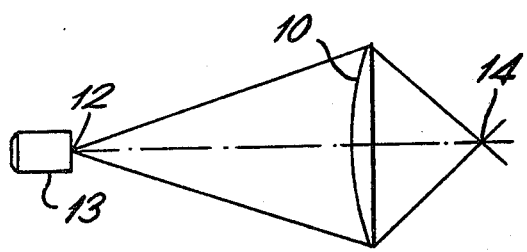
FIG. 1 is a schematic optical diagram representative of the effect of a conventional eyepiece lens.

In FIG. 1, an eyepiece lens system 10 receives light from the limiting aperture 12 of an objective 13, and provides at a focus 14 a conventional exit pupil which, in a high magnification system such as a microscope, is about 2 millimeters or less in diameter. The eye of an observer using the eyepiece directly must be positioned so that the pupil of the eye coincides with the exit pupil at 14.

Figure 2:
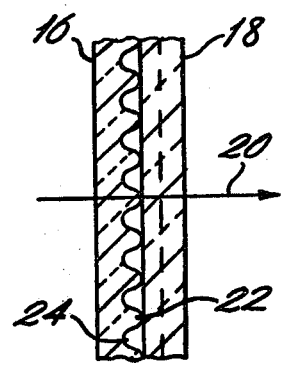
FIG. 2 is a partial sectional view of two rotatable grooved discs comprising the novel optical component of the present invention.

FIG. 2 shows parts of two circular plane discs, 16, 18, rotatable about a common axis 20. The surface of disc 16 is grooved so as to have alternate protrusions 22 and depressions 24 of substantially part-cylindrical form and such that a section through the surface is a continuous, approximately sinusoidal, curve as shown, typically of a pitch of less than 1 millimeter. The disc 18 has identical grooves which are arranged parallel to the plane of the sheet on which FIG. 2 appears, that is, perpendicular to the grooves in disc 16. The grooved surfaces are in contact.

FIG. 3 represents a single one of many generally cylindrical protrusions 22 in disc 16. Reference point 14 represents the position of the conventional exit pupil provided by the eyepiece lens system 10 in FIG. 1; the eyepiece lens system forms a real image at the plane of the disc 16. The protrusion 22 acts as a cylindrical lens and provides at the position indicated by reference point 34 an image of the conventional exit pupil 14. Light from the image at point 34 is visible at an enlarged pupil 26, spread in the plane of the drawing along a line, as indicated by the double-headed arrows, and of width comparable with the diameter of the conventional exit pupil at 14. An observer's eye 28 at any position along the line pupil 26 can receive a narrow pencil of rays, such as the pencil of rays 30, of length in the plane of the drawing determined by the aperture of the eye. The area of the cylindrical surface on which this image is focused is referenced 32. If the eye moves along the line pupil 26, different pencils of rays from different parts of the cylindrical surface and therefore from different parts of the image on that surface will be received, but at no eye position will it be possible to view the whole area of the image received by the cylindrical lens 22. A similar result is obtained if the eye is stationary and the lens 22 is moved parallel to the line pupil 26.

If a field lens having the property defined above is introduced between the position 34 and the observer's eye 28, and if the lens 22 is one of a multiplicity of cylindrical lenses on the surface of the disc 16, then a viewer at any position along the line pupil 26 would be able to see a small part of the image focused on the surface of each cylindrical lens. However, the pupil 26 is still enlarged only in the plane of the drawing so that, even with a multiplicity of cylindrical lenses, it is still essentially a line pupil.

If, however, two orthogonal sets of cylindrical lenses are provided, as shown in FIG. 2, the pupil will be enlarged in two orthogonal directions and the overall enlarged pupil will be of rectangular form. This, however, as previously explained, will still provide an incomplete field, because the area on each cylindrical lens from which an image is received by the eye is still less than the whole lens area.

If the discs 16, 18, in FIG. 2 are rotated about the axis 20 in the same direction and, at the same speed, the areas of image visible to the eye through elemental areas of the discs move continuously so that in a full rotation of the disc, substantially the full field area is visible for some proportion of the scan. If the discs are rotated fast enough, persistence of vision results in an effectively full field of view being received at the enlarged pupil, which is now circular due to the rotation.

In FIG. 2, both of the discs 16, 18, are transparent and an optical system containing two such discs will be referred to as a transmission system. It is also possible to have one disc transparent, the other having a reflective layer on either the grooves or the plane surface; the optical systems incorporating such pairs of discs will then be of the reflection type as shown in FIG. 4.

Figure 4:
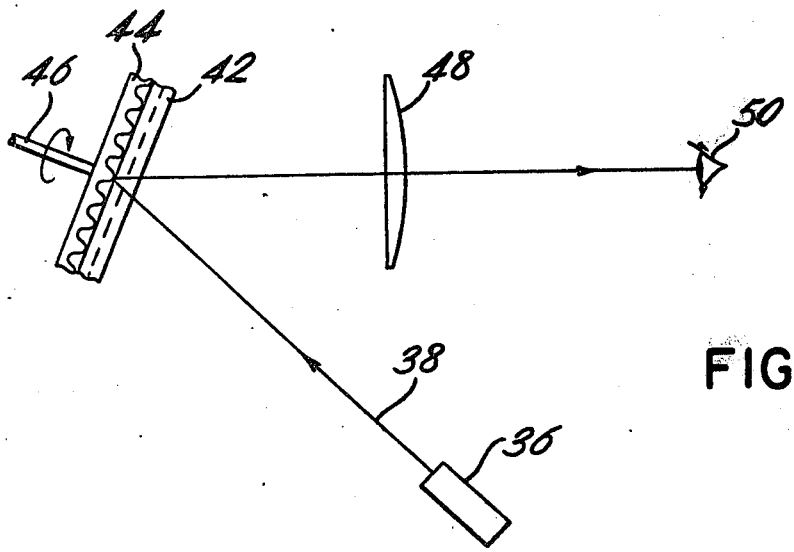
FIGS. 4 and 5 show schematically the optical component of the present invention included reflecting and transmitting microscopes providing optical devices according to the invention.

In FIG. 4, light from a magnifying optical system 36 passes along an optical axis 38 through a transparent grooved disc 42 and is reflected by a second grooved disc 44 which is silvered on the front, grooved surface; the light passes again through disc 42 and a field lens system 48 to an observer 50. The discs can be rotated by an axle 46. The optical system is arranged so that a real image is focused on the plane of contact of the discs.

The observer 50 sees an enlarged image, which by persistence of vision provides a complete field of view. The image can be viewed from a variety of head positions relative to the apparatus, because the exit pupil is enlarged—for example it can be of the order of six inches in diameter.

Figure 5:
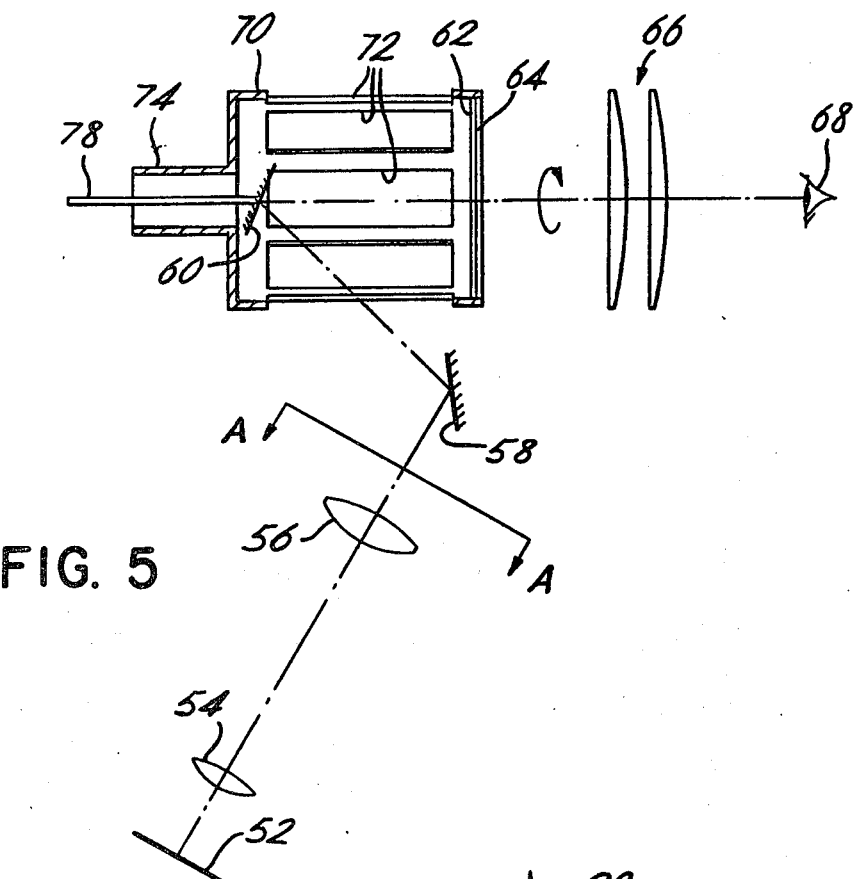

FIG. 5 shows a preferred embodiment of a microscope in accordance with the invention. Light from an object 52 passes through an objective lens system 54 to a projection eyepiece lens 56, is reflected by fixed plane mirror 58 to fixed plane mirror 60, and passes through a pair of rotatable grooved discs 62, 64, and a field lens system 66 to an observer 68. The system is arranged so that a real image of the object is focused on the plane of contact of the pair of discs 62, 64.

The discs 62, 64 are mounted on a rotatable cylindrical drum 70 carried by a rotatable hollow shaft 74 driven by motor (not shown). The drum has a plurality of slots 72 in its surface to allow passage of light between the mirrors 58 and 60. The mirror 60 is supported by a fixed supporting stem 78 which passes through the rotatable hollow shaft 74.

Figure 6:
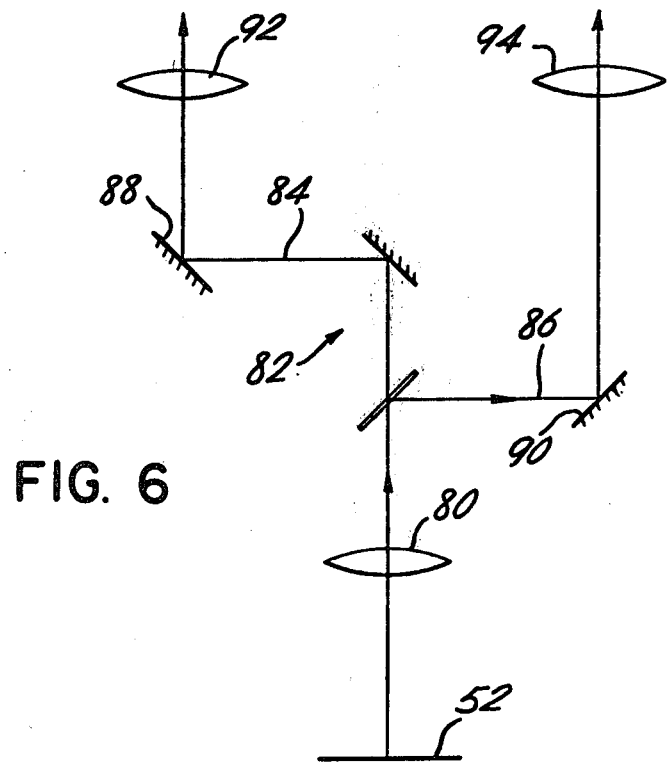
FIG. 6 shows schematically the effect of an optional beam splitting arrangement.

The FIG. 5 embodiment produces a single enlarged exit pupil which can cover both eyes. It is also possible to provide two enlarged exit pupils, at an average interpupilary spacing, by replacing the lenses 54 and 56, that is, apparatus below the line A—A in FIG. 5, by a beamsplitter arrangement as shown in FIG. 6. Light from the object 52 then passes through an objective lens system 80 to a conventional beam-splitter complex 82 which provides two partial beams 84, 86, reflected by respective plane mirrors 88, 90 to two eyepice projection systems 92, 94. A beam from each system 92, 94 then passes into the remainder of the apparatus shown in FIG. 5, and through the discs 62, 64 to an observer. The provision of two enlarged exit pupils can result in higher image brilliance without substantial loss of freedom of head movement.

It is also possible to provide s stereoscopic image at an enlarged pupil. In FIG. 7, light from an object 96 passes through conventional stereoscopic objective lens systems 98 to a mirror complex 100 which provides correct right-and-left handedness in the final image. Light then passes through a pair of projection lens systems 102 which focus images of the object 96 on the plane of contact of a pair of transparent grooved discs 104, 106, and provides two enlarged exit pupils 108, 110 at average interpupilary spacing, after passage through a single field lens system 112.

Figure 8:
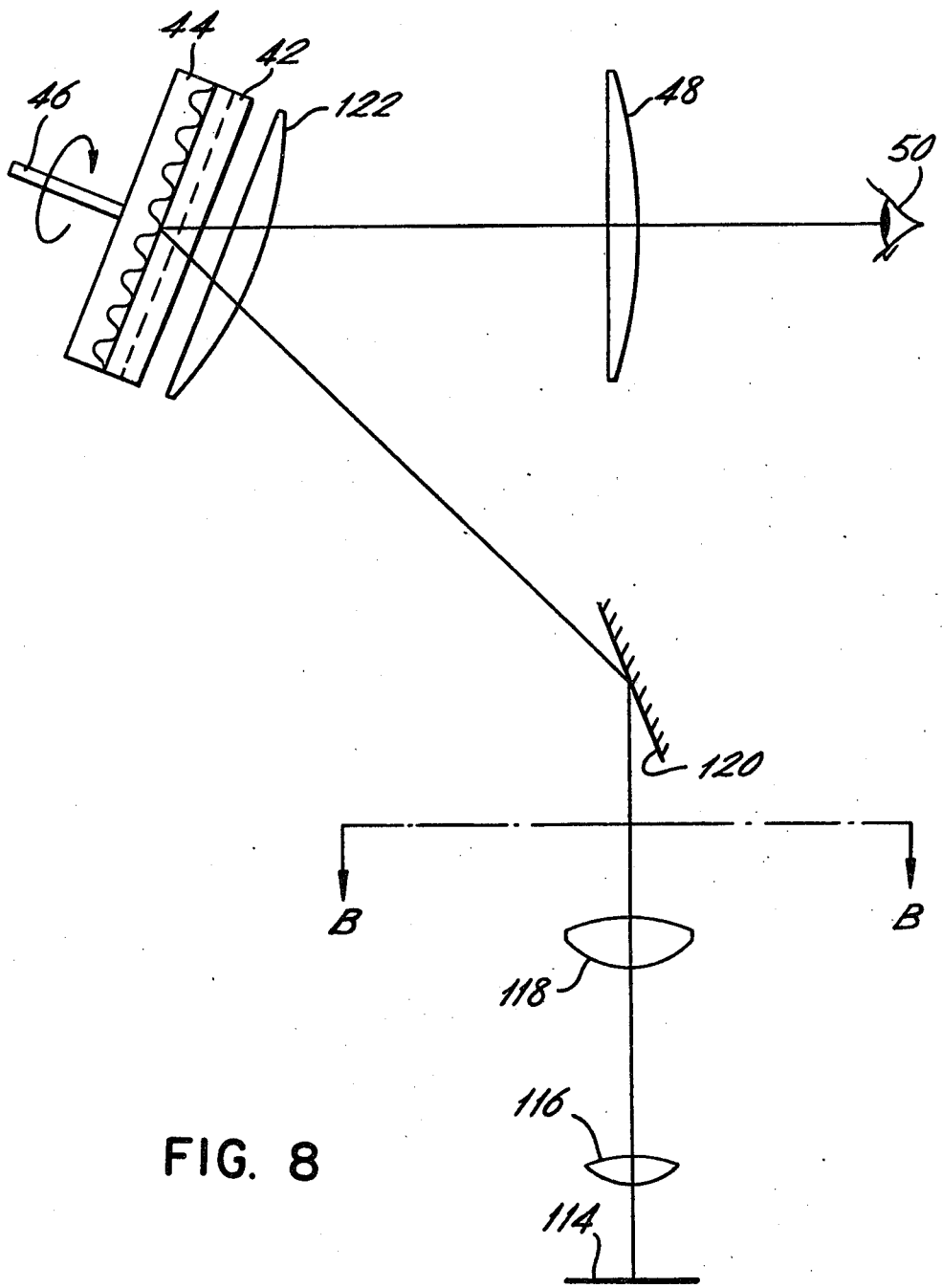

A modification of the reflecting system shown in FIG. 4 is shown in FIG. 8; the modification allows the production of an enlarged exit pupil of sufficient size to produce a biocular image. Identical parts are given identical reference numerals. Light from an object 114 passes through an objective lens system 116 and a projection lens system 118 to a plane mirror 120 which reflects light through a primary field lens system 122 to the two grooved discs 42, 44. Light is reflected by disc 44 back through the lens 122 and through a secondary field lens system 48 to the observer 50.

It is necessary to use the additional system 122 to increase the power of the field lens system so it can fulfill its normal requirements, i.e., provide a full field of view in the absence of the grooved discs. Light is preferably incident as near as possible orthogonally to the disc surfaces to reduce distortion, and the geometrical constraints of this embodiment are such that the field lens 48 cannot be placed sufficiently close to the discs to be of short enough focal length to fulfill the field lens system requirements. Thus the additional lens system 122 is provided; its power is effectively doubled because light passes through it twice.

The apparatus in FIG. 8 below the line B—B may be replaced by the arrangement shown in FIG. 6, if two enlarged exit pupils are required. In another modification, by replacing apparatus below the line by the items 98, 100 and 102 of FIG. 7, two stereoscopic enlarged pupils can be provided.

It is to be understood that application of the invention is not limited to microscopes. Englarged pupils can also be provided in other forms of optical instruments. Possible modifications to apparatus according to the invention include the provision of slightly curved discs instead of plane discs, which could be arranged to counteract field curvature effects. Further, it is not essential that the focal plane coincides precisely with the plane of contact of the two grooved discs although this is always the preferred condition.

The present invention includes all modifications and variations within the scope of the claims and the claims are to be interpreted by their broadest interpretation to which they are susceptible.

I claim:

1. An optical system comprising means for developing an image at a focal plane, an optical component having a pair of members, at least one of which is light transmissive, with opposed generally planar surfaces approximately in said focal plane, each opposed surface having generally parallel grooves such that any section taken through a member transverse to the grooves is distinguished by undulations formed by the grooves, such that every part of such surface is arcuate, the grooves of one member being arranged transverse to the grooves of the other, whereby each pencil of light passing through said at least one member and reaching the opposed surface of the other member is everywhere subject to a magnifying effect to provide a magnified image in said focal plane; means to rotate said optical component in the focal plane; and a field lens system arranged to receive light from said optical component.

2. The optical system according to claim 1 in which the optical component comprises two discs, each grooved on one surface, with the grooved surface in contact.

3. The optical system according to claim 2 in which the grooves of the members of the optical component are of such shape that each grooved surface is defined by a generally periodic repetitive curve.

4. The optical system according to claim 2 in which the optical component comprises two transparent circular discs.

5. The optical system according to claim 2 in which the optical component comprises two circular discs, one disc being transparent and the opposed grooved surface of the other disc being a reflecting surface.

6. The optical system according to claim 2 having necessary components to function as a microscope.

7. The optical system according to claim 2 in which the undulations provided by the generally parallel grooves provide essentially the same radius of curvature at all points on the pair of members.

8. The optical system according to claim 1 in which the grooves of the members of the optical component are of such shape that each grooved surface is defined by a generally periodic repetitive curve.

9. The optical system according to claim 8 in which the optical component comprises two transparent circular discs.

10. The optical system according to claim 8 in which the optical component comprises two circular discs, one disc being transparent and the opposed grooved surface of the other disc being a reflecting surface.

11. The optical system according to claim 8 having necessary components to function as a microscope.

12. The optical system according to claim 8 in which the undulations provided by the generally parallel grooves provide essentially the same radius of curvature at all points on the pair of members.

13. The optical system according to claim 1 in which the optical component comprises two transparent circular discs.

14. The optical system according to claim 13 having necessary components to function as a microscope.

15. The optical system according to claim 13 in which the undulations provided by the generally parallel grooves provide essentially the same radius of curvature at all points on the pair of members.

16. The optical system according to claim 1 in which the optical component comprises two circular discs, one disc being transparent and the opposed grooved surface of the other disc being a reflecting surface.

17. The optical system according to claim 16 having necessary components to function as a microscope.

18. The optical system according to claim 16 in which the undulations provided by the generally parallel grooves provide essentially the same radius of curvature at all points on the pair of members.

19. The optical system according to claim 1 having necessary components to function as a microscope.

20. The optical system according to claim 19 in which the undulations provided by the generally parallel grooves provide essentially the same radius of curvature at all points on the pair of members.

21. The optical system according to claim 1 in which the undulations provided by the generally parallel grooves provide essentially the same radius of curvature at all points on the pair of members.

* * * * *